United States Patent
Lehmann et al.

(10) Patent No.: US 9,543,606 B2
(45) Date of Patent: Jan. 10, 2017

(54) FUEL CELL AND PROCES FOR MANUFACTURING A FUEL CELL

(71) Applicant: Micronas GmbH, Freiburg (DE)

(72) Inventors: Mirko Lehmann, Ebnat-Kappel (CH); Claas Mueller, Freiburg (DE); Holger Reinecke, Emmendingen (DE); Mirko Frank, Baiersbronn (DE); Gilbert Erdler, Ettlingen (DE)

(73) Assignee: Micronas GmbH, Freigburg (DE)

( * ) Notice: Subject to any disclaimer, the term of this patent is extended or adjusted under 35 U.S.C. 154(b) by 0 days.

(21) Appl. No.: 14/221,955

(22) Filed: Mar. 21, 2014

(65) Prior Publication Data

US 2014/0205927 A1 Jul. 24, 2014

Related U.S. Application Data

(62) Division of application No. 12/249,699, filed on Oct. 10, 2008, now Pat. No. 8,715,884.

(30) Foreign Application Priority Data

Oct. 10, 2007 (DE) ........................ 10 2007 048 807

(51) Int. Cl.
*H01M 2/38* (2006.01)
*H01M 8/10* (2016.01)
(Continued)

(52) U.S. Cl.
CPC ....... *H01M 8/1004* (2013.01); *H01M 8/04201* (2013.01); *H01M 8/065* (2013.01);
(Continued)

(58) Field of Classification Search
CPC .. H01M 12/08; H01M 4/383; H01M 8/04201; H01M 8/065; H01M 8/1004; H01M 8/1097; Y02E 60/523
See application file for complete search history.

(56) References Cited

U.S. PATENT DOCUMENTS 4,772,935 A 9/1988 Lawler et al.
6,489,229 B1 12/2002 *Larsen et al.
(Continued)

FOREIGN PATENT DOCUMENTS

| DE | 10255736 A1 | 6/2004 |
|---|---|---|
| DE | 10 2004 011554 A1 | 9/2005 |
| EP | 1 282 184 A2 | 5/2003 |

OTHER PUBLICATIONS

Erdler et al., "Chip Integrated Fuel Cell," Sensors and Actuators A, Elsevier Sequoia S.A., Lausanne, CH, Bd. 132, No. 1, pp. 331-336, XP025081953, ISSN: 0924-4247 (Nov. 8, 2006).
(Continued)

*Primary Examiner* — Patrick Ryan
*Assistant Examiner* — Ben Lewis
(74) *Attorney, Agent, or Firm* — Muncy, Geisler, Olds & Lowe, P.C.

(57) ABSTRACT

The present invention pertains to a fuel cell with a storage unit (4) for storing hydrogen ($H_x$), with a proton conductive layer, which covers a surface of the storage unit (4), and with a cathode (7) on a side of the proton conductive layer, which side is located opposite, wherein the storage unit (4) is directly coupled with an anode and/or the storage unit (4) is incorporated in a substrate (1) of a semiconductor. The storage unit (4) is preferably connected to the substrate (1) at least via a stress compensation layer (3).

19 Claims, 1 Drawing Sheet

(51) Int. Cl.
*H01M 8/04* (2016.01)
*H01M 8/06* (2016.01)
H01M 4/38 (2006.01)
H01M 12/08 (2006.01)

(52) U.S. Cl.
CPC .......... *H01M 8/1097* (2013.01); *H01M 4/383* (2013.01); *H01M 12/08* (2013.01); *Y02E 60/523* (2013.01); *Y02P 70/56* (2015.11)

(56) References Cited

U.S. PATENT DOCUMENTS

| | | |
|---|---|---|
| 2002/0006684 A1 | 1/2002 | Terao et al. |
| 2002/0106541 A1 | 8/2002 | Yamada et al. |
| 2003/0013046 A1* | 1/2003 | Fonash ................ B01J 19/0093 430/314 |
| 2003/0201532 A1 | 10/2003 | Riedl |
| 2003/0232252 A1 | 12/2003 | Mancini et al. |
| 2004/0149759 A1* | 8/2004 | Moser ....................... F17C 1/10 220/581 |
| 2006/0088739 A1 | 4/2006 | Ovshinsky |
| 2006/0127716 A1 | 6/2006 | Lehmann |

OTHER PUBLICATIONS

International Search Report and Written Opinion in Corresponding PCT Application No. PCT/EP2008/008532.

* cited by examiner

FUEL CELL AND PROCES FOR MANUFACTURING A FUEL CELL

This nonprovisional application is a divisional of application Ser. No. 12/249,699, which was filed on Oct. 10, 2008 and which claims priority under 35 U.S.C. §119(a) to German Patent Application No. 10 2007 048 807.8, which was filed in Germany on Oct. 10, 2007, and which is herein incorporated by reference.

BACKGROUND OF THE INVENTION

The present invention relates to fuel cells and methods of manufacturing fuel cells.

As technology continues to advance, autonomous microsystems will likely be increasingly used for logging of measured values at poorly accessible or mobile sites. Such a microsystem typically includes an interconnection of, for example, sensors, actuators, a signal processor and a power supply. To output processed measured values, a microsystem may further include a transmitting unit or another interface for data output. Significant advancements have been made in the miniaturization and reduction of power consumption for sensor systems and actuator systems. Similar advancements, however, have not been made for power supplies.

Typically, intelligent microsystems include integrated circuits that Complementary Metal Oxide Semiconductor (CMOS) technology. Such integrated circuits typically include p-channel and n-channel Metal Oxide Semiconductor Field Effect Transistors (MOSFETs). By incorporating CMOS technology, however, materials and processes used for the intelligent micro system must be CMOS-compatible, which is particularly relevant to CMOS processes that are monolithically performed on silicon chips. Furthermore, storage media should have a high energy density-, components should be compatible with the environment, and the power supply should be able to be miniaturized and cost effective.

The power supply for such autonomous microsystems can include batteries, storage batteries and micro fuel cells. Fuel cell systems have already become established as macroscopic energy systems. However, manufacturing fittings and guides having sufficient tolerances for mechanical components such as valves and pressure regulators, which include movable parts, has become increasingly more complicated due to needs for miniaturization. Attempts made so far at miniaturizing fuel cells are, therefore, limited to the fuel cell proper. Prior art methods include several approaches towards manufacturing PEM (Proton Exchange Membrane) fuel cells according to the silicon technology. Separate hydrogen storage units are made available, especially used, for power supply. In addition, direct methanol fuel cells are known, which are designed as passive systems, the oxidant methanol being supplied from a storage tank via capillary forces to the anode of the fuel cell. The $CO_2$ gas bubbles formed during the reaction of the methanol are likewise removed using capillary forces.

SUMMARY OF INVENTION

The object of the present invention is to provide an alternative fuel cell or a process for manufacturing such a fuel cell, wherein miniaturization, including a hydrogen storage unit, is made possible. In particular, a monolithic reaction will be made possible in conjunction with the CMOS technology.

According to an embodiment of the present invention, a fuel cell or a monolithic arrangement according to a CMOS technology is provided that includes a storage unit for storing hydrogen, a proton conductive layer and a cathode. The proton conductive layer covering a surface of the storage unit. The storage unit being directly coupled with an anode, the storage unit itself forms an anode and/or the storage unit is included in or on a substrate of a semiconductor.

In an embodiment, the storage unit is connected to the substrate at least via a stress compensation layer. The stress compensation layer is advantageously made of a ductile material such as, but not limited to, tin, gold, silver, lead, cadmium or indium. Tin is especially preferred because of its environmental compatibility.

In another embodiment, the stress compensation layer is formed in all areas in a direct vicinity of the substrate and of the storage unit for the hydrogen. In other words, the stress compensation layer is formed around the storage unit on all sides towards which the substrate is arranged adjacent to the storage unit directly or via additional inserted layers. Where the fuel cell has a trough structure, in which the storage unit is accommodated, the stress compensation layer can correspondingly extend over the wall areas within the trough between the storage unit and the substrate.

In another embodiment, a diffusion barrier is formed between the storage unit and the substrate such that a reduced quantity of or preferably no hydrogen can escape from the storage unit towards the substrate. The diffusion barrier may be formed from silk-on nitride and/or silica and/or an oxynitride layer.

In another embodiment, the diffusion barrier is formed in all areas in a direct vicinity of the substrate and of the storage unit for receiving the hydrogen and optionally other layers. Correspondingly, the storage unit may additionally be surrounded by a diffusion barrier, which inhibits or prevents the passage of hydrogen from the storage unit to the substrate.

In another embodiment, the storage unit is completely surrounded, in a part of its circumferential area, by a proton conductive and non-hydrogen conducting layer, in the other areas of its circumference by a diffusion barrier for hydrogen. Such an arrangement ensures that hydrogen cannot diffuse over time from the hydrogen storage unit.

In another embodiment, the storage unit is in contact with one side of the proton conductive layer and in which a self-breathing air diffusion layer is formed as the cathode on the side that is opposite thereto, wherein the self-breathing air diffusion layer is sufficiently porous for the passage of air, especially for the passage of oxygen.

In another embodiment, the storage unit, which is capable of receiving hydrogen, is embedded in a cavity or pit within a substrate, preferably one comprising silicon, wherein a stress compensation layer and/or a diffusion barrier for hydrogen is formed between a surface of the storage unit and a surface of the substrate, which said surfaces are adjacent to each other.

According to another embodiment of the invention, a method is provided for manufacturing a fuel cell. The method includes: forming a cavity or pit in a substrate comprising silicon; forming a stress compensation layer comprsing a ductile material, and a diffusion barrier for inhibiting or blocking the passage of hydrogen in said cavity; filling the remaining cavity with a storage unit comprising palladium; covering the diffusion barrier, the stress compensation layer and the storage unit with a proton-conductive, non-hydrogen conducting layer such that the cathode allows air and/or oxygen to pass through.

Such a fuel cell can be manufactured in a surprisingly simple manner and offer a large number of advantages. For example, the mass of the hydrogen being fed to the fuel cell can be controlled by varying the material properties of the surface of the hydrogen storage unit as well as by varying the contact surface between the hydrogen storage unit and the fuel cell. The hydrogen preferably reaches the membrane electrode unit (MEA) from the hydrogen storage unit directly by diffusion. The fuel cell may be configured as a self-breathing system, i.e., the use of atmospheric oxygen from the immediate environment, making it possible to build up the fuel cell system completely without active components such as guiding systems and valves.

The fuel cell, including the hydrogen storage unit, is especially well suited for miniaturization based due to its simple design. If the fuel cell is constructed from CMOS compatible materials, the fuel cell including the storage unit for the hydrogen can be monolithically integrated at the chip level.

The advantage of such a fuel cell design over other electrical energy sources, for example, storage batteries, is that the capacity and the output can be set separately from one another. The capacity of the fuel cell is set by setting the layer thickness of the integrated hydrogen storage unit because of the fixed surface area and the fixed volume. The output is obtained from the contact surface between the integrated hydrogen storage unit and the polymer electrolyte membrane.

BRIEF DESCRIPTION OF THE DRAWINGS

An exemplary embodiment will be explained in more detail below on the basis of the drawings. In the drawings, FIG. 1 schematically shows a side view of a cut-away fuel cell and reaction formulas for illustrating the process in some of the fuel cell areas.

DETAILED DESCRIPTION OF THE DRAWINGS

Figure 1:
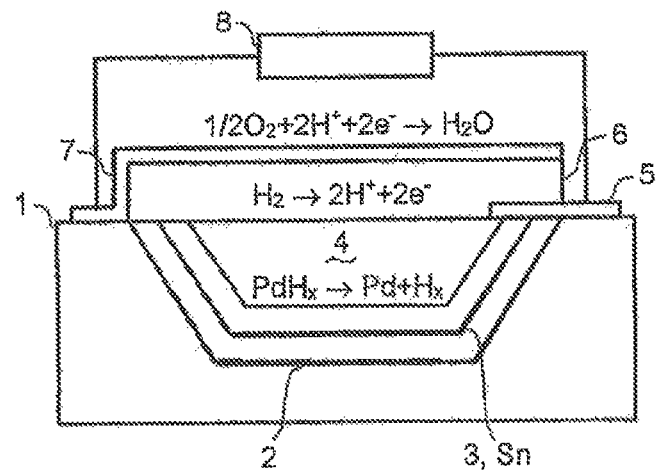
Figure 2:
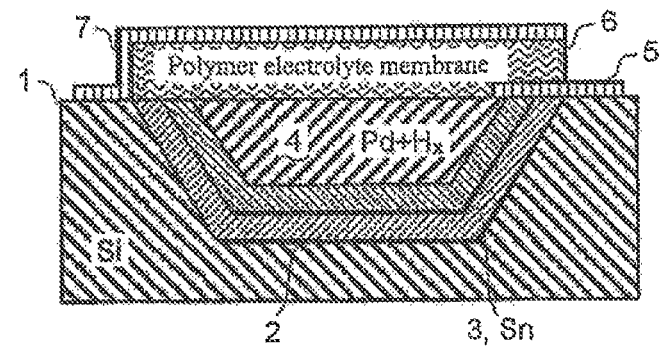
FIG. 2 shows the fuel cell according to FIG. 1 in a section view.

FIGS. 1 and 2 schematically illustrate a section of a semiconductor arrangement that includes an integrated fuel cell. Improved miniaturization is achieved by directly integrating the fuel cell on or in a silicon chip. Components, which were separated in prior art fuel cells, are now combined in new functional units. In particular, a hydrogen storage unit is integrated directly in the fuel cell structure. The hydrogen storage unit is coupled directly with an anode of the fuel cell.

A pit, which is filled with various layers and materials, is formed in a substrate I made of silicon. A diffusion barrier 2, which can reduce or prevent the passage of hydrogen, is located directly adjacent to the substrate 1. A stress compensation layer 3, which comprises, e.g. tin, is located adjacent the diffusion barrier on a side opposite the substrate 1. A storage unit 4 adapted as a hydrogen storage unit, which at the same time forms an anode, is located adjacent the stress compensation layer 3 on a side opposite the diffusion barrier 2. In a preferred embodiment, the storage unit 4 comprises palladium.

In the embodiment of FIGS. 1 and 2, the diffusion barrier 2 and the stress compensation layer 3 are arranged in a trough-shaped configuration in the pit, where each pit has upper, outside edges that are flush with a surface of the substrate 1. The storage unit 4 also has a surface, which is flush with the surface of the substrate 1, diffusion barrier 2 and stress compensation layer 3. As a result, the storage unit 4 is completely surrounded, with respect to substrate 1, by first the stress compensation layer 3 and then by the diffusion barrier 2.

The storage unit 4 undergoes an expansion or contraction by up to about 12% when it is respectively loaded or unloaded with hydrogen. Material and dimensions of the stress compensation layer 3 are selected such that the expansion and the contraction of the storage unit 4 is compensated to prevent separation of the arrangement from the substrate 1 and/or cracking in the substrate I. Preliminary experiments have shown that, for example, a stress compensation layer 3 with a layer thickness of 70 μm is suitable at a layer thickness of 130 μm for the storage unit 4.

An anode contact 5 is located above the substrate 1, the diffusion barrier 2, the stress compensation layer 3 and the storage unit 4. The anode contact extends from a top-side edge area of the storage unit 4 via the top-side edge sections of the stress compensation layer 3 and the diffusion barrier 2 to the surface of the substrate 1 for electrically contacting the anode formed by the storage unit 4. In addition, the surface of the entire arrangement which comprises the storage unit 4 and the top-side or outside edge sections of the stress compensation layer 3 and of the diffusion barrier 2, is covered with a membrane 6. The membrane 6 designed as a polymer electrolyte membrane or proton conductive layer. The membrane 6 is preferably covered completely by a cathode 7 functioning as a second electrical connection contact on the side of the membrane 6 that is located opposite the arrangement and is hence the outer side. The cathode 7 preferably extends, on at least one circumferential edge section, laterally from the membrane 6, up to the substrate 1 and extends in parallel over the surface of the substrate 1 in order to form a connection contact point An electrical user 8, therefore, can be connected to the cathode 7 and to the anode contact 5 in order to be supplied with electric power.

In a preferred embodiment, the storage unit 4 is adapted as a hydrogen storage unit comprising palladium Pd, which is partially filled with hydrogen. When an electric load, such as the user 8, is connected, $PdH_x$ is correspondingly reacted into $Pd+H_x$ in the storage unit 4. Transition of hydrogen to protons and electrons takes place in membrane 6. Water, $H_2O$, is formed by the reaction $1/2O_2+2H^++2e^-$ by the stored hydrogen reacting with atmospheric oxygen, which is fed in on the outside via the cathode 7.

In some embodiments, the storage unit 4 is applied directly to the silicon-based substrate 1 and is rigidly connected thereto. The hydrogen storage unit 4 can thus be directly integrated on a chip. To ensure long-term stability of hydrogen storage in the palladium of the storage unit 4, all the surfaces that have no contact with the fuel cell, i.e., the membrane 6, are shielded with the diffusion barrier 2 over the environment in order to suppress or prevent the diffusion of hydrogen.

To prevent hydrogen from escaping in the area of the top side, the membrane 6 covers the entire surface of both the storage unit 4 and of other adjoining components or layers in the surface area up to the diffusion barrier 2. The membrane 6 is preferably hydrogen gas-tight and is coupled with the storage unit 4 over the full surface area.

Such a diffusion barrier 2, which will be used as a hydrogen diffusion layer, can be preferably deposited using silicon nitride layers or oxy nitride layers via chemical vapor deposition (CVD). During experimentation, a silicon substrate 1 was adhered by a combination of polysilicon and palladium with subsequent formation of palladium silicide.

The stress compensation layer 3 is placed between the diffusion barrier 2 and the storage unit 4 in the embodiment shown in FIGS. 1 and 2 to compensate or at least sufficiently reduce stresses that develop because of an enlargement of the volume of the storage unit 4 during loading with hydrogen. CMOS-compatible solutions are hereby made possible in manufacture. The mechanical stresses developing at the interface to the silicon substrate 1 during the loading or unloading of the integrated storage unit 4 with hydrogen are compensated by a tin layer preferably deposited by electroplating, which forms the stress compensation layer 3.

In an alternative embodiment, the stress compensation layer 3 and the diffusion barrier 2 may be formed and arranged in the reverse order between the substrate 1 and the storage unit 4. In other words, the stress compensation layer 3 may be disposed between the silicon substrate and the diffusion barrier 2.

During operation of the disclosed fuel cell, the hydrogen being stored in the palladium of the storage unit 4 diffuses in the atomic form to the boundary surface between the coupled membrane 6 and the storage unit 4 after the connection of a load such as the user 8. Based on the catalytic action of palladium, the hydrogen dissociates into a proton and an electron. The protons migrate through the polymer electrolyte membrane, whereas the electrons reach the cathode 7 of the fuel cell via the user 8 to be operated. The protons react at the cathode 7 with the electrons and the atmospheric oxygen from the environment to form water.

The stress compensation layer 3 should have a relatively low modulus of elasticity possible in order to reduce the mechanical stresses towards the substrate 1. To compensate the mechanical stresses of the palladium storage unit, a material that is as ductile and as reversibly deformable as possible is selected for the stress compensation layer 3. In addition, the material of the stress compensation layer 3 should have a good adhesive strength both to the palladium storage unit 4 and to the silicon substrate 1 or to the thin layers, which are applied to the substrate 1 and which are usually inserted.

In addition, materials are preferably used that can be deposited according to typical methods employed in semiconductor technology or compatible methods or can be manufactured, in case of greater layer thicknesses, using thick-layer processes, for example, electroplating, screen printing or casting processes. In addition, the materials used to form the stress compensation layer 3 will preferably be environmentally compatible. Such ductile materials include gold, silver, lead, cadmium, indium or tin. Tin is especially preferred in terms of environmental compatibility and cost-effectiveness for manufacture. Therefore, a fuel cell system may advantageously be formed from silicon, palladium, a polymer electrolyte membrane with palladium current collector and tin. These selected materials advantageously are materials that typically do not harm the environment.

Figure 3A:
FIGS. 3A-E show the process steps for manufacturing such a fuel cell.

FIGS. 3A-E show a sequence of steps for the manufacture of the fuel cell in FIGS. 1 and 2. Referring to FIG. 3A, a pit 11 is formed in the substrate 1, which may be carried out, for example, by wet chemical etching with KOH⁻ or dry etching. Typical manufacturing steps for forming the pit 11 include masking the silicon surface, opening the masking in a desired area in which the storage unit 4 will be formed, preparing the cavity of the pit 11, and removing the masking layers.

Figure 3B:

Referring to FIG. 3B, the diffusion barrier 2 (i.e., the barrier for hydrogen) is formed at the walls of the pit 11. For example, this may be carried out by preparing an oxide layer from SiO and the subsequent preparation of the nitride layer proper by CVD to form $Si_3N_4$.

Figure 3C:

Referring to FIG. 3C, a bonding agent layer and an electroplating starting layer are deposited. The bonding agent layer preferably includes polysilicon prepared by CVD. The electroplating starting layer preferably includes palladium applied by physical vapor deposition (PVD). The Pd silicide formation proper takes place by tempering. Polysilicon is used according to typical CMOS processes as an adhesive layer for palladium. Palladium is formed at the boundary to the palladium silicide, because polysilicon is present thereunder. The polysilicon thus forms a bonding agent layer 12. This is used primarily for contacting, and, above all, reinforcement with aluminum is possible as well.

Figure 3D:

Referring to FIG. 3D, the stress compensation layer 3 proper is formed in the pit 11 on the layer structure located therein. After masking the silicon surface of the substrate 1 using typical lithographic processes, the stress compensation layer 3 proper, which includes Tin (Sn), is applied using an electroplating process.

Figure 3E:
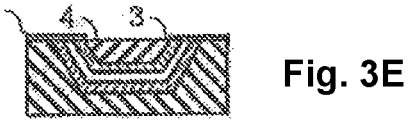

Referring to FIG. 3E, the storage unit 4 proper, which includes palladium Pd, is formed using a typical Pd electroplating process in the remaining pit 11 after the preparation of the stress compensation layer 3. Planarization of the surface is performed using, for example, a polishing machine in order to obtain a uniform surface over the substrate 1, storage unit 4 and edges of the stress compensation layer 3, which reach the surface between these, and the diffusion barrier 2. The storage unit 4 can further be contacted by, for example, a corresponding masking of the surface using a lithographic process, the preparation of a gold layer to form the contacts using, e.g., PVD by vapor deposition and structuring of gold strip conductors from the gold layer 9.

After the palladium has been filled into the pit 11 as an anode or storage unit 4 and before the membrane 6 is applied, the storage unit 4 is filled with hydrogen. The hydrogen diffuses into the palladium. The proton conductive membrane 6 is subsequently applied as a cover, which does not let hydrogen through, on the one hand, but does let protons through, on the other hand. The structuring may also be carried out using typical process steps from CMOS processes such as, for example, the use of Reactive Ion Etching (RIE). Advantageously, auxiliary layers may be used to protect the silicon substrate. Adhesion of the polymer electrolyte membrane to the palladium storage unit is preferably achieved using a bonding substance, which is added to the polymer dispersion. Atomic hydrogen is thus advantageously already present in the palladium of the storage unit 4 or of the anode before coverage with the membrane 6.

The polymer electrolyte membrane is subsequently formed as the membrane and the cathode 7 is formed on the surface of the substrate 1 or of the materials introduced into the pit 11. To design a semiconductor technological embodiment of a self-breathing air diffusion layer, a current collector for electrical return to the substrate 1 and a fine, catalytically active palladium lamellar structure is preferably constructed on the membrane 6. The palladium lamellar structure at the same time forms the self-breathing air diffusion layer and the cathode 7 of the fuel cell. Microstructured sputtering masks, which are prepared using deep etching process known as advanced silicon etching from, for example, silica wafers having a thickness of 300 µm, may be used to structure the palladium current collector and the palladium air diffusion electrode. The web width of the lamellar structure formed was 100 µm in preliminary experiments. Such a microstructured palladium catalyst is highly porous and hence permeable to air. A CVD silicon nitride layer was used as a suitable electrical insulation layer between the anode and cathode according to preliminary experiments.

The invention claimed is:

1. A fuel cell comprising:
a storage unit for storing hydrogen;
a proton-conductive layer, which covers a first surface of said storage unit; and
a cathode on a side of said proton-conductive layer, the side being located opposite said storage unit,
wherein said storage unit is directly coupled with an anode and said storage unit is arranged within a cavity in a substrate of a semiconductor, and wherein the storage unit has a lamellar structure filling the cavity, the lamellar structure being composed of palladium.

2. The fuel cell of claim 1, wherein a second surface of the storage unit, adjacent to the substrate, is covered with a hydrogen diffusion barrier.

3. A fuel cell, comprising:
a storage unit for storing hydrogen;
a proton-conductive layer that covers a first surface of the storage unit;
a cathode disposed on a first side of the proton-conductive layer, the side being located opposite the storage unit, wherein the storage unit, capable of absorbing hydrogen, forms an anode and is embedded in a cavity or depression of a substrate comprising silicon;
a hydrogen diffusion barrier formed between the storage unit and the substrate; and
a stress compensation layer formed between the storage unit and the substrate.

4. The fuel cell of claim 3, wherein the hydrogen diffusion barrier is disposed on a second surface of the storage unit opposite the proton diffusion layer and adjacent to the substrate.

5. The fuel cell of claim 3, wherein a portion of the proton-conductive layer is formed between the anode and the cathode.

6. The fuel cell of claim 3, wherein the stress compensation layer is formed between the hydrogen diffusion barrier and the storage unit.

7. The fuel cell of claim 6, further comprising a bonding agent layer formed between the hydrogen diffusion barrier and the stress compensation layer.

8. The fuel cell of claim 7, wherein the bonding agent layer is made of polysilicon and an electroplating starting layer.

9. The fuel cell of claim 8, wherein the polysilicon comprises a palladium-silicide layer.

10. The fuel cell of claim 3, wherein the stress compensation layer is formed between the hydrogen diffusion barrier and the substrate.

11. The fuel cell of claim 3, wherein the stress compensation layer is formed from a ductile material, the ductile material comprising tin, gold, silver, lead, cadmium, or indium.

12. The fuel cell of claim 3, wherein the stress compensation layer is formed on all surfaces of the storage unit that directly face the substrate.

13. The fuel cell of claim 3, wherein the hydrogen diffusion barrier between the storage unit and the substrate is formed such that hydrogen is reduced or cannot escape from the storage unit to the substrate.

14. The fuel cell of claim 3, wherein the hydrogen diffusion barrier is formed from silicon nitride or silicon oxide or an oxynitride layer.

15. The fuel cell of claim 3, wherein the storage unit is completely surrounded by a combination of the proton conductive layer and the hydrogen diffusion barrier, wherein a portion of a circumferential area of the storage unit is covered by the proton-conductive layer and a remaining portion of the circumferential area is covered by the hydrogen diffusion barrier, and wherein the proton conducting layer is a proton-conducting and non-hydrogen-conducting layer.

16. The fuel cell of claim 3, wherein the first surface of the storage unit is in contact with a second side of the proton-conductive layer, and wherein, on the first side of the proton-conductive layer opposite the second side, a self-breathing air diffusion layer is formed as the cathode, wherein the self-breathing air diffusion layer is porous and allows for the passage of air or oxygen.

17. The fuel cell of claim 3, wherein the cathode extends, on at least one circumferential edge region, laterally from the proton-conductive layer to the substrate.

18. The fuel cell of claim 3, wherein an anode contact is formed, which extends from an edge area on the first surface of the storage unit, across edge sections of the stress compensation layer and the hydrogen diffusion barrier, to a surface of the substrate.

19. A monolithic arrangement comprising: CMOS technology and an integrated fuel cell according to claim 3.

* * * * *